United States Patent [19]
Taylor et al.

[11] 3,848,294
[45] Nov. 19, 1974

[54] HANDLING LIVE ANIMALS TO PREPARE THEM FOR SLAUGHTER

[75] Inventors: Charles R. Taylor; Albert J. Bernhardt, both of Sterling; Jerry L. Bradford, Rock Falls, all of Ill.; Donald J. Willems, Sioux City, Iowa

[73] Assignee: Armour and Company, Phoenix, Ariz.

[22] Filed: July 25, 1973

[21] Appl. No.: 382,315

[52] U.S. Cl. .................................... 17/45, 17/1 A
[51] Int. Cl. ......................... A22b 5/02, A22b 1/00
[58] Field of Search ............................... 17/1 A, 45; 119/98–103

[56] References Cited
UNITED STATES PATENTS
2,537,387  1/1951  Wnetrzak .......................... 17/1 A
3,724,027  4/1973  Zober .............................. 17/1 A Primary Examiner—Paul E. Shapiro
Attorney, Agent, or Firm—Frank T. Barber; Carl C. Batz

[57] ABSTRACT

This invention includes methods for handling live animals to prepare them for slaughter, including lifting the hind portions of the animal, attaching a shackle to a leg of the animal and hoisting the animal to an overhead rail. Apparatus is provided for use in carrying out this procedure including an enclosure, and a hoist structure within the enclosure for raising the hind portion of the animal to facilitate shackling. The apparatus also includes hoisting mechanism for raising the shackled animal to an overhead rail without bruising the animal or damage to the apparatus.

11 Claims, 3 Drawing Figures

PATENTED NOV 19 1974　　3,848,294
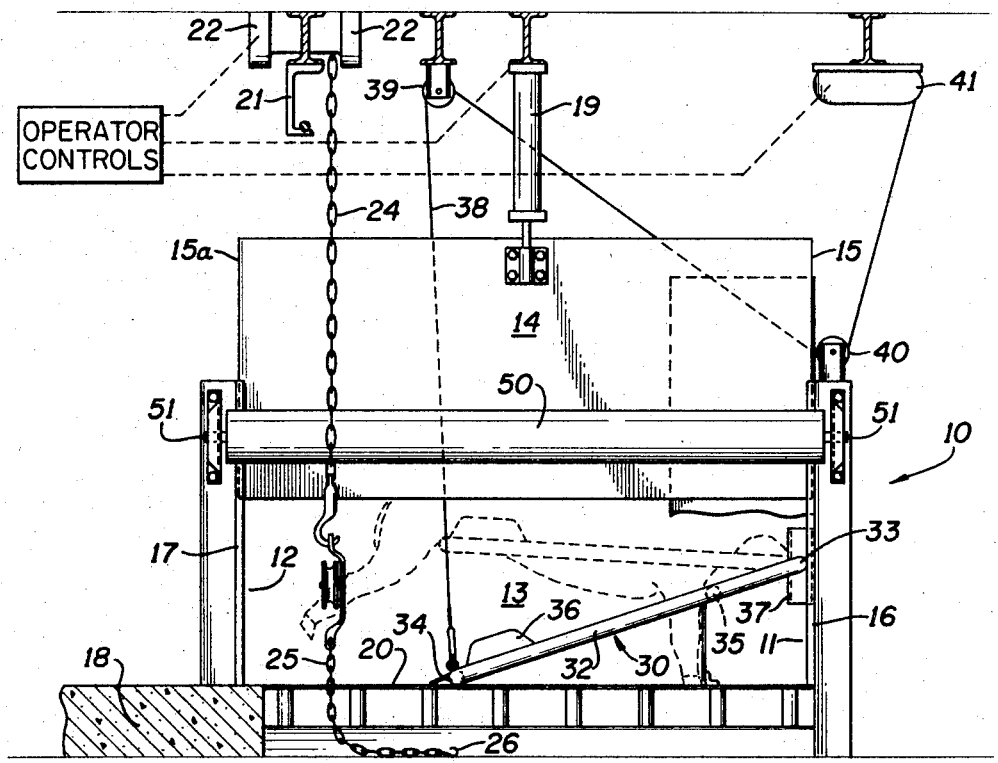
FIG. 1
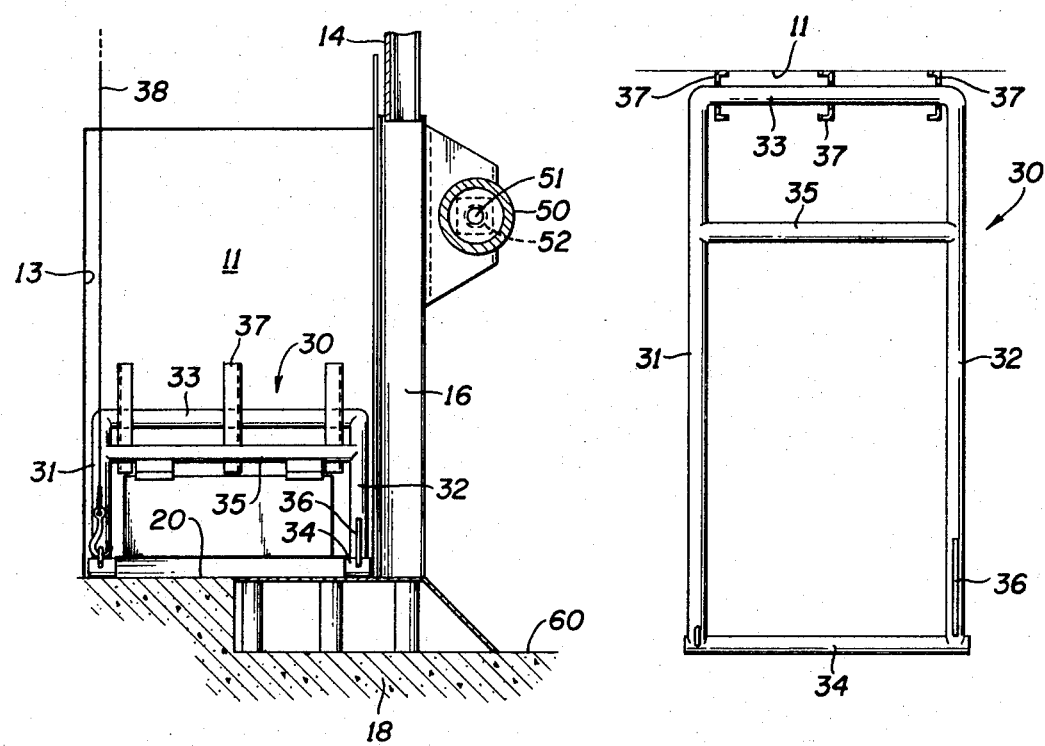
FIG. 2
FIG. 3

HANDLING LIVE ANIMALS TO PREPARE THEM FOR SLAUGHTER

This invention relates to methods and apparatus for handling live animals to prepare them for slaughter and includes procedures and devices for shackling the animals in a safe and easy manner and for hoisting the shackled animals to an overhead rail.

One of the most hazardous tasks to be performed in the slaughtering of meat animals is that of placing a shackle about one of the legs of an animal so that the animal may be hoisted to a rail along which it moves in the course of the slaughtering procedure. The animal naturally kicks and struggles and this frequently results in broken arms or other injuries to the persons who attempt to apply the shackle. Even after shackling has been accomplished the struggles of the animal when it is being hoisted tends to bruise the animal and wreck the equipment which may have been used to restrain it.

It is therefore an object of the present invention to provide methods and apparatus for restraining animals in a manner which will substantially immobilize and present the hind leg of the animal for convenient shackling, and it is a further object to provide methods and apparatus for removing the animal, after shackling, from the restraining apparatus and hoisting it to the usual overhead rail commonly utilized in slaughtering operations.

It is a further object to provide such methods and apparatus which are simple in operation and construction and which will be as free as possible from misfunction or breakdown.

Further objects and advantages of the invention will be apparent as the specification proceeds.

DETAILED DESCRIPTION

One embodiment of our invention is set forth in the accompanying drawings in which;

FIG. 1 is a front elevational view of the improved apparatus;

FIG. 2 is a view in elevation looking toward the forward end of the enclosure; and FIG. 3 is a detail plan view of the hoisting structure and its mounting at the front of the enclosure.

As illustrated, the improved device includes an enclosure 10 having elongated sides, a forward end wall 11 and a rear door 12. The enclosure may be used as a chute, and with door 12 open cattle may be driven forwardly one by one into the enclosure in preparation for shackling. The back side 13 of the enclosure may be any kind of solid wall, but the front side of the enclosure is provided with a door 14. The front edge 15 of door 14 is slidably disposed in a vertical channel of the frame post 16 and the rear edge 15a of door 14 is slidably disposed in a vertical channel of the post 17. Post 16 and 17 are well anchored in the foundation 18 and their channels allow for vertical movement of door 14 for opening and closing.

As means for opening and closing door 14 there is shown a fluid cylinder 19 having its top end secured to the ceiling of the room in which the device is utilized. The lower end of the piston of cylinder 19 is attached to the top edge of the door. Fluid may be admitted to cylinder 19 on one or another side of the piston to open or close the door. Controls for admitting and releasing the fluid under pressure are at the operator's station, which in FIG. 1 is represented by a square labeled "Operator Controls."

The floor 20 of the enclosure 10 is supported by foundation 18 and is on an even level with the floor of the entrance to the enclosure.

Attached to the ceiling of the room and spaced from the side of the enclosure 10 is an overhead rail 21 (As seen in FIG. 1 the rail is in front of the enclosure). Associated with this rail is the device schematically indicated by the squares 22 which is commercially used in the packing industry for placing the shackle trollies onto a rail.

The trolley 23 has attached to it the upper chain 24 which is utilized by device 22 to bring the trolley to the rail, and has attached to it the lower chain 25 having an end hook 26 on the lower end. In the shackling operation the operator places the chain 25 about the leg of an animal and places the end hook 26 over the chain. Controls for operating the device 22 are also at the operator's station.

We provide a hoist structure 30 which is better shown in FIG. 3. This structure is generally rectangular in shape, having side members 31 and 32, a front end bar 33 connected with the forward ends of members 31 and 32, and a transverse hoist member 34 at the rear of the structure having its ends connected with the rear ends of side members 31 and 32. Each of members 31, 32, 33 and 34 are preferably cylindrical in shape. Placed rearwardly of the front bar 33 is an intermediate bar 35 which has its ends connected with side members 31 and 32. This bar serves not only to strengthen the hoist structure but, as will later be more clearly explained, to restrain forward movement of the animal within the enclosure. Also, we provide a guard 36 at the lower end of said member 32 for the purpose of restraining the animal against slipping sidewise off the hoist structure and striking the door 14.

The hoist structure 30 is disposed within the enclosure 10 in the manner illustrated in FIG. 1 with the hoist member 34 on the floor 20 and the front bar 33 supported in a tiltable fashion at the front of the enclosure. The forward end wall 11 may be of steel sheet or other solid material, and on this is mounted two or more supports 37 which may be of channel iron or other suitable material. Each of supports 37 has a recess through which the front bar 33 extends, so that the front bar is pivotally supported and the hoist structure can move up and down tiltably about its bearings in the supports 37.

A cable 38 is attached to the hoist structure at the place the side member 31 is attached to the hoist member 34. This cable extends upwardly about pulley 39 at the ceiling of the room, and then extends under pulley 40 mounted on post 16 and then to the motorized hoist device 41. Device 41 is of known type construction and is operated by controls at the operator's station. By operation of this control the operator may activate the device 41 to raise or lower the hoist member 34 at will.

With the hoist structure 30 in the position shown in FIG. 1 and the door 14 in lowered or closed position an attendant may open the door 12 long enough to permit one animal to be driven into the enclosure 10. As the animal moves forward it steps over the hoist member 34 with its front legs, advancing until it is restrained by the bar against its shoulder. At this point the operator starts operation of the device 41 to raise the hoist structure 30 causing the structure to move about its front pivot. The hoist member 34 which is disposed under the animals belly just in front of his hind legs, is raised to contact the belly of the animal and so raise the hind feet of the animal well off the floor of the enclosure.

When the upward movement of structure 30 has started so as to engage the belly of the animal the operator moves his control to raise door 14, and when the hind feet are raised well off the floor of the enclosure, stops the elevation of the hoist structure. The pressure of the hoist member 34 against the animal's belly in front of the animal's hind legs serves during the application of the pressure to squeeze nerves which lie close to the belly skin so as to paralyze the hind portion of the animal, thus immobilizing the hind legs of the animal. In that position the hind legs of the animal extend downwardly in convenient positions for shackling.

While the animal is in this position a man may stand at the side of the enclosure on the floor 60 (see FIG. 2), reach through the opening provided by the open door 14 and place the shackling chain about one of the animal's hind legs, preferably the leg which is farthest from him and nearer the side 13 of the enclosure. For the purpose of shackling the door need be open only partly to provide an opening wide enough to allow the man to approach the animal's legs.

When the leg of the animal has been shackled the door 14 may be fully opened and device 41 actuated to lower the hoist structure 30. Operation of hoist device 22 pulls the rear of the animal sidewise towards the opening provided by the now open door 14. The animal is pulled, hind feet first, through the door opening and upwardly toward the overhead rail.

We have found that there is a tendency so as for the body of the animal to strike and damage the side door of the enclosure. Also when the animal is too close to the door the head or neck of the animal may catch on the lower edge of the door so as to damage it. To prevent such damage and prevent bruises to the animal, we provide the roller 50 which serves as a guide holding the animal away from the door as the animal is being raised. Roller 50 is in elongated cylindrical form. Preferably this roller extends horizontally across the entire length of door 14. At each end it has an axial spindle 51 which extends into a bearing 52 which is mounted on brackets 53 secured to post 16. In this way the roller 50 is spaced from the plane of door 14 and is freely rotatable.

After the animal has been pulled sidewise through the opening provided by the door of 14 and begins to move upwardly it contacts the front side of roller 50 which guides it away from door 14 and causes it to be spaced sidewise out the door.

As shown in FIG. 2 of the drawings we prefer to have the floor 20 at a higher level than is the floor 60 of the area at the side of the enclosure. This arrangement facilitates hoisting the animal and at the same time avoides likelihood that the animal's head or foreportions will strike the floor after moving sidewise through the opening.

After the animal has been hoisted the trolley is transferred to the overhead rail as in the former practice and passed along the rail where the usual slaughtering operations are performed.

While we have described in detail only one embodiment of our invention, it is understood that many variations may be made in the apparatus and the methods employed all within the spirit of the invention and all within the scope of the appended claims.

We claim:

1. A method of shackling an animal comprising driving the animal into an enclosure having a side door in closed position, raising the rear end of the animal by elevating a hoist member located in front of the animal's rear leg and under the rearward portion of the animal's belly to raise the hind feet of the animal off the floor of the enclosure, opening said side door, attaching a shackle to one of said animal's hind legs, and hoisting the shackled animal through the opening provided by the open door and upwardly on the outside of said enclosure.

2. A method as set forth in claim 1 including the step of guiding the animal as it is being hoisted to prevent its contact with the outside of said door.

3. A device for shackling live animals comprising an enclosure into which an animal may be driven, a hoisting structure, means for pivotally supporting the front end of said structure at the forward end of said enclosure to permit a pivotal movement of said structure about a horizontal axis, said structure having at its rearward end a hoist member which when the animal occupies the enclosure extends under the belly of the animal, and means for lifting said structure to move it about its pivotal support and to cause said hoist member to lift the rear end of the animal to thereby present the hind legs of the animal in position for shackling.

4. A device as set forth in claim 3 wherein said supporting means includes brackets which are secured to the front wall of said enclosure.

5. A device as set forth in claim 3 wherein said hoist member is a cylindrical bar.

6. A device as set forth in claim 3 wherein said lifting means includes a cable connected to a rear portion of said structure.

7. A device as set forth in claim 6 wherein the floor of said enclosure is elevated to a higher level than the floor of the area in front of said door.

8. A device as set forth in claim 3 wherein said enclosure has at one side a door which may be opened to provide an opening through a side of said enclosure and has also hoist means for removing an animal from said enclosure through said opening after the animal has been shackled.

9. A device as set forth in claim 8 including means for opening said door to permit shackling of an animal through said opening and control means at a position available to an operator for actuating (a) said structure lifting means (b) said door opening means and (c) said hoist means.

10. A device as set forth in claim 8 including means outside said enclosure and spaced from the side of said enclosure for guiding an animal away from said door as the animal is being hoisted on the outside of the enclosure after it has passed through said opening.

11. A device as set forth in claim 10 wherein said guiding means includes a roller which is rotatable about a horizontal axis.

* * * * *